United States Patent Office 3,109,007
Patented Oct. 29, 1963

3,109,007
DERIVATIVES OF TETRACYCLINE
AND ITS ANALOGS
Robert K. Blackwood, Gales Ferry, Hans H. Rennhard, Lyme, John J. Beereboom, Waterford, and Charles R. Stephens, Jr., Niantic, Conn., assignors to Chas. Pfizer & Co., Inc., New York, N.Y., a corporation of Delaware
No Drawing. Filed Oct. 2, 1962, Ser. No. 227,936
8 Claims. (Cl. 260—346.2)

This invention relates to new tetracycline compounds. More particularly, the present invention is concerned with the products and intermediates obtained by direct halogenation of tetracycline.

The tetracycline antibiotics comprise a group of biologically active perhydronaphthacene derivatives having the following essential structural features. The numbering system indicated is that employed by "Chemical Abstracts."

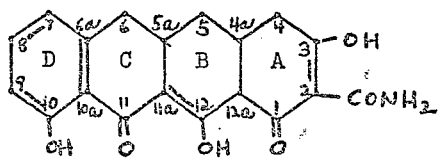

Among the biologically active members of this group are those containing the following substituent groups:

| Substituents | Common Name |
|---|---|
| 4-N(CH$_3$)$_2$, 6-OH, 6-CH$_3$, 12a-OH | tetracycline. |
| 4-N(CH$_3$)$_2$, 5-OH, 6-OH, 6-CH$_3$, 12a-OH | 5-oxytetracycline. |
| 4-N(CH$_3$)$_2$, 6-OH, 6-CH$_3$, 7-Cl, 12a-OH | 7-chlorotetracycline. |
| 4-N(CH$_3$)$_2$, 5-OH, 6-CH$_3$, 12a-OH | 6 - deoxy - 5 - oxytetracycline. |
| 5-OH, 6-CH$_3$, 12a-OH, 6-OH | 4 - desdimethylamino-5-oxytetracycline. |
| 4-N(CH$_3$)$_2$, 6-CH$_3$, 12a-OH | 6-deoxytetracycline. |
| 4-N(CH$_3$)$_2$, 12a-OH | 6-deoxy-6-demethyl-tetracycline. |
| 4-N(CH$_3$)$_2$, 6-OH, 6-CH$_3$, 7-Br, 12a-OH | 7-bromotetracycline. |
| 4-N(CH$_3$)$_2$, 6-OH, 7-Cl, 12a-OH | 6-demethyl-7-chloro-tetracycline. |
| 6-OH, 6-CH$_3$, 12a-OH | 4-desdimethylamino-tetracycline. |
| 6-OH, 6-CH$_3$, 7-Cl, 12a-OH | 4 - desdimethylamino-7-chlorotetracycline. |
| 4-N(CH$_3$)$_2$, 6-OH, 12a-OH | 6-demethyltetracycline. |
| 12a-OH | 6 - deoxy - 6 - demethyl-4-desdimethylamino tetracycline. |

Among the present new compounds are 11a-halotetracyclines of the following formulae:

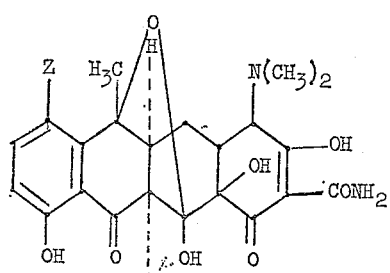

(I)

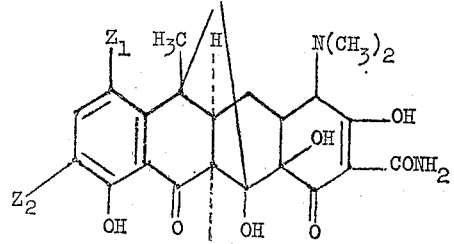

(II)

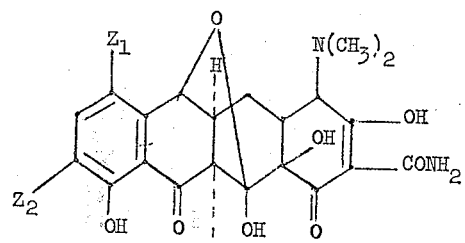

(III)

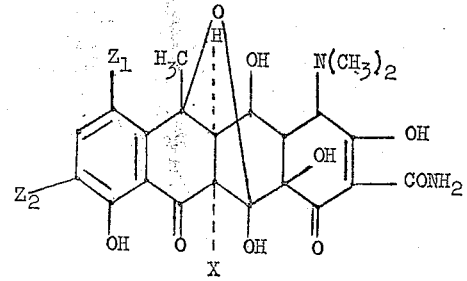

(IV)

wherein:
Z is hydrogen or chloro;
X is halo, preferably chloro or fluoro;
Z$_1$ is hydrogen, chloro, bromo or iodo; and
Z$_2$ is hydrogen, nitro, amino and lower alkanoylamino.

Also included within the scope of the present invention are the acid addition salts of the compounds of the above formulae.

As is obvious, the halogen atom at the 11a-position of the present new compounds may exist in both the cis and trans relationship to the hydrogen at the 5a-position of the tetracycline nucleus. Those compounds in which the halogen is cis are believed to exist predominantly in the structure designated, i.e., the structure containing an oxygen bridge between the 6 and 12 positions of the tetracycline nucleus, resulting from the formation of a hemi-ketal between the 12-position carbonyl function and the hydroxy group at the 6-position. Of course, such structures exist in equilibrium with the non-ketalized form, e.g.,

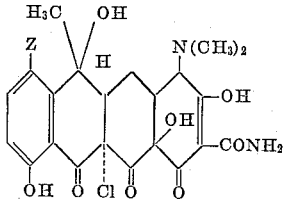

particularly in solution and when reference is made herein to the hemi-ketal compounds, it is fully intended that this designation embraces the non-ketalized compounds as well as the hemi-ketal. In the crystalline state, these compounds appear to be predominately in the form of hemi-ketal structure as is evidenced by the lack of unconjugated carbonyl absorption on infrared analysis (no bands in the 5–6 micron region). The present new epoxy compounds are 11a-halo-1,4,4a,5,5a,6,11,11a,12,12a-decahydro-3,10,12,12a-tetrahydroxy-1,11-dioxo-2-carboxamidonaphthacene-6,12-epoxides. For the sake of simplicity, the present new halo compounds hereinafter will be referred to as 11a-halo-tetracycline-6,12-hemi-ketals.

The new 11a-halo tetracyclines of this invention are prepared by reaction of a suitable tetracycline with a halogenating agent in a reaction-inert solvent. Suitable known tetracycline starting compounds include tetracycline, oxytetracycline, chlortetracycline, 6-demethyltetracycline and 6-demethylchlortetracycline. The tetracycline starting compound, of course, should have a 6-hydroxy substituent in order to form the hemi-ketal structure. For the production of the present new 11a-halotetracyclines in which the halogen is Cl, Br, or I, a variety of halogenating reagents may be employed in a reaction-inert solvent. Suitable halogenating agents include bromine; chlorine, iodochloride; iodobromide; N-chloro N-iodo-, and N-bromo lower alkanoic acid amide, e.g. N-chlor- and N-bromacetamide; hydrocarbon dicarboxylic acid imides, e.g. N-chloro-, N-bromo- and N-iodosuccinimide, phthalimide, and the like and N-lower-alkanoyl anilides e.g. N-bromoacetanilide, propionanilide and the like; 3-chloro-, 3-bromo, 3,5-dichloro and 3,5-dibromo-5,5-dimethyl-hydantoin; pyridinium perchloride hydrochloride; and lower alkyl hypochlorites, e.g. 3° butylhypochlorite. It is obvious that, in general, any halogenating agent commonly employed in the art is operable, but the above are preferred.

By "reaction-inert solvent" as employed herein is meant a solvent which, under the conditions of the reaction, does not react in an undesired manner with either starting compounds or final products. A minimum of laboratory experimentation will permit the selection of suitable solvents for the present process. Exemplary of such solvents are dioxane, tetrahydrofuran, the dimethyl ether of diethylene glycol (diglyme), and the dimethyl ether of ethylene glycol (monoglyme). For chlorination in aqueous media, a pH near the isoelectric point of the tetracycline is desirable. Thus, the amphoteric form of the starting antibiotic may be employed for preparation of 11a-chloro-tetracycline- and -oxytetracycline-hemi-ketals in aqueous media; or alternatively, if the starting compound is introduced as an acid addition salt such as the hydrochloride, an approximately equivalent proportion of a suitable base such as triethylamine should be added prior to the introduction of the halogenating agent. It is usually preferred, but not essential, that water be excluded from the reaction mixture when the desired product is an 11a-bromo or iodo compound, which appear to be quite water-sensitive. If water is included in the reaction mixture, prolonged exposure of 11a-bromo or iodo compounds should be avoided to prevent appreciable lowering of the yield of desired product. Temperature does not appear to be critical in this process, temperatures of from −25° to 50° C. being found suitable. Temperatures above 50° C. should preferably be avoided due to the possible formation of 5a,6-anhydro compounds with consequent lowered yield of the desired products. The selection of the best reaction conditions, e.g. temperature, solvent, halogenating agent, etc., is a matter of routine experimentation. It is preferable to choose a solvent system from which the 11a-halo product crystallizes on formation, particularly in the case of the bromo and iodo compounds. For example, a 1:1 benzene-monoglyme (dimethyl ether of ethylene glycol) is found to be a preferred solvent system for 11a-brominating oxytetracycline. The product readily separates from the reaction mixture on formation. If this product remains in solution for any prolonged periods of time, appreciable degradation appears to occur with a substantial lowering of the product yield. As previously mentioned, the 11a-bromo and iodo compounds appear to be very water sensitive. 11a-bromo-5-hydroxytetracycline-6,12-hemi-ketal hydrobromide dissolves in water to give a solution with pH of about 2. After about 1.5 hours, the product is not detectable, being degraded to a substance presumed to be a lactone. Boiling the 11a-halo product with acetone gives a high regeneration of 5-hydroxytetracycline, the starting compound. On treatment with aqueous sodium hydrosulfite, the starting compound is also obtained from the 11a-bromo hemi-ketal.

The 11a-chloro compounds do not appear to be as highly reactive as the corresponding 11a-bromo compound, thus reducing the necessity of special handling. Once formed, they are in fact quite stable in aqueous solutions at low pH values. For example, 11a-chlorotetracycline-6,12-hemi-ketal hydrochloride on standing in water at pH of about 1 for 18 hours at room temperature shows no detectable decomposition.

The preparation of 11a-fluorotetracyclines is accomplished by contacting the starting tetracycline compound with perchloryl fluoride in the presence of a base, preferably an alkali metal hydroxide or alkoxide. The reaction is usually carried out by dissolving the starting compound in the selected solvent containing at least a molar equivalent of the base and adding perchloryl fluoride, a gas at room temperature, in the usual fashion. As the reaction proceeds, the pH of the solution drops from alkaline to near neutral values, the product usually commencing to separate at a pH of approximately 8. The crystalline product is collected in the usual fashion and dried.

In addition to the 11a-halotetracycline-6,12-hemi-ketals, the present proces also yields 11a-halotetracyclines, i.e., those in which hemi-ketal formation has not ocurred, in which it is presumed that the 11a-halo atom is on the reverse side of the 11a-carbon atom from the halogen of the hemi-ketals. It is thought that the stereochemical relationship of the former prevents formation of the hemi-ketal structure. These compounds are generally obtained by evaporation of the reaction mixture after precipitation of the 6,12-hemi-ketal compounds.

The 7-halogenated compounds of the present invention are generally obtained by contacting the selected 11a-halotetracycline-6,12-hemi-ketal with a halogenating (chlorinating, brominating or iodinating) agent in a reaction-inert solvent as previously defined, the preferred solvent medium being anhydrous liquid hydrogen fluoride or hot trifluoroacetic acid. The halogenated product obtained by this method is determined by the molar ratio of halogenating agent employed. With a substantially equimolar ratio of halogenating agent, the corresponding 7,11a-dihalo product is obtained as a principal product, which may also contain 9,11a-dihalo compound. After halogenation is completed, the products are obtained by the usual methods. Generally, the method employed involves the addition of a non-solvent to the reaction mixture with subsequent recovery of the precipitated product.

The 9-nitro products of the present invention may be obtained by employing a nitric acid-acetic acid mixture at low temperature, e.g., 0–5° C., using standard procedures. Preferably, this nitration is carried out by employing potassium nitrate as the nitrating agent and utilizing anhydrous liquid hydrogen fluoride as the reaction medium. Nitration of the 11a-halo-tetracyclines-6,12-hemi-ketals favors the 9-position although some 7-nitro product may be concurrently formed. Such a mixed product may be separated into its components by column partition chromatography.

Aromatic substitution reactions, i.e., halogenation and nitration of the 11a-halo-6,12-hemi-ketals of the present invention which have a 6-methyl substituent poses certain problems because most of these reactions are conducted in acid media which tend to cause dehydration to the corresponding 11a-halo-6-deoxy-6-demethyl-6-methylenetetracycline. The order of relative ease in dehydration is as follows:

(1) 11a-chlorotetracycline-6,12-hemi-ketal
(2) 5-hydroxy-11a-chlorotetracycline-6,12-hemi-ketal
(3) 11a-fluorotetracycline-6,12-hemi-ketal
(4) 5-hydroxy-11a-fluorotetracycline-6,12-hemi-ketal The first compound listed is dehydrated almost instantaneously in acids such as liquid hydrogen fluoride and is, therefore, not susceptible to aromatic substitution reactions in which a hemi-ketal product is desired. This will explain why Structure I hereinabove does not include D-ring substituents which are introduced following hemi-ketal formation. The next two compounds require several hours for dehydration in acids such as liquid hydrogen fluoride and may, therefore, be employed as starting materials for producing aromatic substituted derivatives thereof. In spite of the several hour requirement for substantial dehydration, the resulting product on aromatic substitution reaction may contain corresponding 6-deoxy-6-demethyl-6-methylenetetracycline. Where a relatively pure hemi-ketal product is desired, partition chromatography on a column of cellulose powder suffices to obtain separation. In view of the fact that the fourth compound above is dehydrated quite slowly, it presents no problem as an intermediate for aromatic substitution reactions.

The 9-nitro-11a-fluorotetracycline-6,12-hemi-ketals may be converted to the corresponding 9-amino compounds by the usual methods for converting nitro compounds to amino, i.e., catalytic reduction in a solvent for the starting compound in the presence of a noble metal catalyst, such as palladium or, preferably, rhodium, and at atmospheric or super-atmospheric hydrogen pressures.

With particular reference to the compounds of Structures III and IV wherein X is chloro, and although the 9-nitro derivatives thereof may be obtained by the previously discussed method of nitration, conversion of these derivatives to the corresponding 9-amino compounds generally results in concurrent removal of the 11a-chloro substituent to form 9-aminotetracyclines. Thus, when it is desirable to produce 9-amino-11a-chloro-tetracycline-6,12-hemi-ketals of Structures III and IV, it is necessary to subject the corresponding 9-aminotetracyclines to the 11a-halogenation reaction previously described. Thereafter, such compounds are susceptible to direct halogenation to produce the 7-halo-9-amino-11a-chlorotetracycline-6,12-hemi-ketals of Structures III and IV.

The acylation of 9-amino compounds is accomplished by the usual methods known to those in the art. A preferred method involves acylation of the 9-amino-11a-halotetracycline-6,12-hemi-ketal with an acid anhydride or obvious equivalent, such as the corresponding acid chloride (in the presence of a base, e.g., a tertiary amine such as pyridine) in a reaction-inert solvent. A particularly useful formylating agent is acetoformic acid, which is prepared by mixing 1 volume of 100% formic acid with 2 volumes of acetic anhydride. The resulting reagent provides 1 equivalent per 72 ml.

The 11a-halotetracycline-6,12-hemi-ketals of Structures II—IV inclusive are useful as intermediates for the preparation of D-ring substituted tetracyclines. The latter are biologically active antibiotics which may be formulated into various compositions analagous to the parent tetracyclines and are useful thereaputically, in feeds and in veterinary practice and agriculture. For the preparation of such tetracyclines, those hemi-ketals of Structures II—IV which have been subjected to the previously described aromatic substitution reactions are subsequently dehalogenated in the 11a-position, which results in concurrent rupture of the hemi-ketal bond and formation of the desired tetracycline.

The 11a-dehalogenation is effected by either chemical or catalytic reduction, using procedures well known to those in the art. Nitro groups, where present, are reduced to amino during 11a-dehalogenation. Catalytic reduction, which is especially suitable for the 11a-chloro compounds, may be conducted in a solvent for the starting compound, in the presence of a noble metal catalyst and at atmospheric or superatmospheric hydrogen pressures. Temperature does not appear to be critical in the catalytic hydrogenation. However, temperatures of from 0 to about 20° C. generally give best results and are therefore preferred. Room temperature is eminently suitable. The noble metal catalysts, e.g. palladium or, preferably, rhodium, are advantageously employed on a support such as carbon, in which form they are commonly available.

The solvent selected for the hydrogenation should, of course, be reaction-inert, that is, incapable of reaction with the starting compound, the product, or hydrogen, under the conditions of the reaction. A variety of organic solvents may be used, and a minimum of laboratory experimentation will permit the selection of a suitable solvent for any specific starting compound. Generally, lower alkanols, e.g. methanol or ethanol, are found most suitable, although a variety of other solvents may be used. Where it is merely necessary to remove 11a-halogen, an equimolar amount of hydrogen is required. The reaction should be terminated when the calculated amount of hydrogen has been consumed, since the compounds are susceptible to further hydrogenation, e.g. removal of 7-halogen, particularly when palladium is used as catalyst.

A variety of chemical reducing agents may also be used for the 11a-dehalogenation reaction. These include active metals in mineral acids, e.g. zinc or iron in dilute hydrochloric acid; alkali metal hydrosulfites, preferably sodium hydrosulfite, which is commercially available, in aqueous media; and sodium iodide in a halogen-acceptor solvent such as acetone or methanol, preferably in the presence of zinc metal. With 11a-fluoro starting compounds reduction with zinc and mineral acids is the preferred procedure. When aqueous systems are used in the aforementioned chemical reactions, it is at times desirable to include a water-miscible solvent, particularly when the starting compound is of limited solubility in the aqueous reaction mixture. The water-miscible solvent does not alter the course of the reaction, but merely provides for more efficient reduction, e.g. shorter reaction time, by insuring more intimate contact of the reactants. A large number of solvents are suitable for this purpose, including dimethylformamide, dimethoxyethane, methanol, ethanol, acetone, dioxane, tetrahydrofuran and the like.

The 11a-halotetracycline-6,12-hemi-ketals of Structures I, II and IV are also useful as intermediates to produce the corresponding 11a-halo-6-deoxy-6-demethyl-6-methylenetetracyclines. This conversion is accomplished by treatment with a strong acid of the dehydrating type such as hydrogen fluoride, sulfuric, trifluoroacetic, polyphosphoric or perchloric acid and the like. Of these, the preferred is liquid hydrogenfluoride. Optimum reaction conditions are readily determined by routine experimentation. Generally, the starting compound is merely added to the selected acid and allowed to react for a period which may range from 1 hour to several days. When employing liquid hydrogen fluoride and treating the residue by standard procedures, the product is obtained as the crystalline hydrofluoride salt and may be converted to the free base or any desired salt in the usual manner.

11a-Dehalogenation of the above-mentioned 11a-halo-6-deoxy-6-demethyl-6-methylenetetracyclines is effected by the previously described procedures to produce the corresponding 6-deoxy-6-demethyl-6-methylenetetracyclines. However, catalytic reduction will generally be avoided with 11a-fluoro-6-deoxy-6-demethyl-6-methylenetetracyclines because of the tendency for concurrent hydrogenation of the double bond of the 6-methylene group under the comparatively vigorous conditions usually required for 11a-defluorination.

The 5-hydroxy-6-demethyl-6-deoxy-6-methylenetetracyclines produced from the novel intermediates of the present invention have utility as described in U.S. Patent No. 2,984,686. Of these compounds, the 5-hydroxy-9-amino- and 9-alkanoylamino-6-deoxy-6-demethyl-6-methylenetetracyclines are distinguished by a number of important advantages, particularly their high in vitro potency and remarkable freedom from serum binding, as well as excellent in vivo protection against infection.

The 6-deoxy-6-demethyl-6-methylenetetracyclines which may be produced from the hemi-ketals of the present invention as represented by Structures I—II are useful for oral or parenteral treatment of acute infections which can be quickly cured, as well as for topical application purposes, in which respects they share the utility of the above-discussed 5 - hydroxy - 6 - deoxy - 6 - demethyl - 6 - methylenetetracyclines. However, several of the 6-methylenetetracyclines which do not possess the 5-hydroxy group have caused thyroid darkening in test animals subjected to prolonged oral and parenteral treatment at high dosage levels. The significance of this phenomenon is not yet known. Thus, and still these compounds have been clinically evaluated, it is impossible to state whether the same manifestation will be associated with prolonged treatment of man, and whether or not such manifestation will be reversible. In any case, these compounds will be useful for the aforementioned treatment of quickly cured acute infections and for topical purposes.

The present invention embraces the acid addition salts of the newly recognized amphoteric compounds, including salts of mineral acids such as hydrochloric, hydriodic, hydrobromic, hydrofluoric, phosphoric, metaphosphoric, nitric, perchloric and sulfuric acids, as well as salts of organic acids such as tartaric, acetic, citric, malic, benzoic, glycollic, gluconic, gulonic, succinic, arylsulfonic, e.g. p-toluene-sulfonic acids, and the like. Such salts are valuable for isolation, purification and crystallization of the newly recognized substances. Among them, the mineral acid addition salts are preferred.

The application for this patent is a continuation-in-part of application Serial No. 130,740, filed August 11, 1961 and now abandoned, the later application being in turn a continuation-in-part of application Serial No. 31,236, filed May 23, 1960 and now abandoned.

It is to be understood that the foregoing description and the working examples appearing hereinafter are for the purpose of illustration only and not limiting to the scope of the invention which is set forth in the claims.

EXAMPLE 1

*11a-Fluorotetracycline-6,12-Hemi-Ketal*

To a suspension of 20 g. of tetracycline base in 800 ml. of water cooled to 0° C. is added 45 ml. (2 equivalents) of 2 N sodium hydroxide solution. The tetracycline dissolves to yield a solution, the pH being approximately 11. Perchloryl fluoride is then bubbled through the stirred solution (maintained under a nitrogen atmosphere) until the pH of the mixture approximates 7. A heavy precipitate starts to form between pH 8 and 8.5. The excess perchloryl fluoride is flushed out with a stream of nitrogen and the nearly white crystalline material is filtered off, washed with water and dried under vacuum at room temperature to obtain 7.9–8.5 g. of product. Ultraviolet absorption shows maxima at 267 and 340 m$\mu$; infrared shows no carbonyl absorption below 6 microns. Bioassay against *K. pneumoniae* shows an activity of 8 mcg./mg. on the tetracycline scale. Elemental analysis gives the following results:

Calcd. for: $C_{22}H_{23}N_2O_8F \cdot H_2O$: C, 54.95; H, 5.20; N, 5.83. Found: C, 54.97; H, 5.19; N, 5.85.

EXAMPLE 2

*11a-Fluoro-5-Hydroxytetracycline-6,12-Hemi-Ketal*

To a mixture of 6.9 g. of anhydrous oxytetracycline base dissolved in 285 ml. of methanol cooled in an ice bath is added 1 equivalent of 1 N sodium methoxide-methanol solution. The yellow sodium salt precipitates. Perchloryl fluoride is bubbled in and the sodium salt redissolves. As the mixture nears neutrality a heavy precipitate starts to form. The excess perchloryl fluoride is swept out with a stream of nitrogen, the product filtered off, washed with cold methanol and dried under vacuum at room temperature to obtain 5.1 g. of pale yellow crystals. Infrared absorption shows no carbonyl absorption below 6 microns. Bioassay against *K. pneumoniae* shows an activity of 4 mcg./mg. on the tetracycline scale. Ultraviolet absorption shows maxima at 265 and 336 m$\mu$. Elemental analysis gives the following results after recrystallization of the product from water.

Calcd. for: $C_{22}H_{23}O_9N_2F \cdot 2H_2O$: C, 51.4; H, 5.25; N, 5.5. Found: C, 51.2; H, 5.3; N, 5.7.

EXAMPLE 3

*11a-Chlorotetracycline-6,12-Hemi-Ketal*

To a solution of 2.2 g. of anhydrous tetracycline in 25 ml. of monoglyme (dimethyl ether of ethylene glycol) is added 800 mg. of N-chlorosuccinimide with stirring to dissolve the reagent. The mixture is allowed to stand for seven minutes and then diluted with water (25 ml.). The product, 873 mg., crystallizes as white needles. Bioassay of the product shows a tetracycline activity of about 4 mcg./mg. against *K. Pneumoniae*. Infrared analysis no carbonyl bands between 5 and 6 microns. Ultraviolet absorption shows maxima at 267 and 340–342 m$\mu$.

On treatment of this product with sodium hydrosulfite in aqueous dimethylformamide at room temperature, tetracycline is regenerated. Bioassay of the reaction mixture shows a tetracycline activity of 520–665 mcg./mg. (*K. pneumoniae*).

The crystalline hydrochloride of this product is obtained by dissolving it in excess aqueous HCl (pH ca. 1) and freeze drying the mixture.

EXAMPLE 4

*7,11a-Dichlorotetracycline-6,12-Hemi-Ketal*

A mixture of 2.4 g. of anhydrous 7-chlortetracycline, 800 mg. of N-chlorosuccinimide, and 25 ml. of 1,2-dimethoxyethane is stirred for 2½ minutes, after which 100 ml. of ether is added, followed by 300 ml. of hexane. The precipitate thus formed is collected by filtration, washed with hexane and dried.

In similar fashion, 7-bromo-11a-chlorotetracycline-6,12-hemi-ketal is prepared from 7-bromotetracycline.

EXAMPLE 5

*11a-Chloro-5-Hydroxytetracycline-6,12-Hemi-Ketal*

Twenty-three grams of anhydrous oxytetracycline is dissolved in 250 ml. of 1,2-dimethoxyethane and 8 g. of N-chlorosuccinimide is next added. The mixture is stirred for two minutes and then poured into 1 liter of stirred water. The product which separates is collected by filtration, water-washed and dried. Infrared analysis of the product (KBr at 1% concentration) shows no carbonyl absorption in the 5–6 micron region but shows the following principal peaks: 6.12, 6.35, 6.66, 6.85, 7.22, 7.55, 7.75, 7.92, 8.14, 8.36, 8.78, 9.18 and 9.43 microns. Bioassay of the product shows a tetracycline activity of 4 mcg./mg.

EXAMPLE 6

*6-Demethyl-11a-Fluorotetracycline-6,12-Hemi-Ketal*

The procedure of Example 1 is repeated substituting an equivalent amount of 6-demethyltetracycline as starting material to obtain the desired product.

EXAMPLE 7

*6-Demethyl-11a-Chlortetracycline-6,12-Hemi-Ketal*

The procedure of Example 4 is repeated substituting an equivalent amount of 6-demethyltetracycline as starting material to obtain the desired product.

EXAMPLE 8

*6-Demethyl-7,11a-Dichlorotetracycline-6,12-Hemi-Ketal*

The procedure of Example 4 is repeated substituting an equivalent amount of 6-demethyl-7-chlortetracycline as starting material to obtain the desired product.

EXAMPLE 9

*6-Demethyl-7-Chloro-11a-Fluorotetracycline-6,12-Hemi-Ketal*

The procedure of Example 1 is repeated substituting an equivalent amount of 6-demethyl-7-chlorotetracycline as starting material to obtain the desired product.

EXAMPLE 10

*9-Nitro-11a-Fluorotetracycline-6,12-Hemi-Ketal*

To a solution of 1 g. of 11a-fluorotetracycline-6,12-hemi-ketal in 8 ml. of anhydrous liquid hydrogen fluoride (HF) at 0° C. is added 220 mg. of $KNO_3$. The mixture is stirred for 30 minutes at 0° C. and the HF evaporated off under nitrogen. The product is obtained by slurrying in dry ether, filtering and drying.

EXAMPLE 11

*9-Amino-11a-Fluorotetracycline-6,12-Hemi-Ketal*

A mixture of 1 g. of the Example 10 product in 50 ml. tetrahydrofuran containing 200 mg. of 5% rhodium on carbon is hydrogenated at room temperature and 50 p.s.i. hydrogen pressure until three molar equivalents of hydrogen are consumed. The catalyst is filtered off and the filtrate evaporated to dryness in vacuo to obtain the product.

EXAMPLE 12

*9-Formylamino-11a-Fluorotetracycline-6,12-Hemi-Ketal*

To a solution of 4.5 g. of the product of Example 11 in 40 ml. of dry pyridine is added 20 ml. of acetoformic acid at ice bath temperature. The mixture is stirred for 15 minutes at that temperature and added dropwise to 1 liter of dry ether. The product is filtered, reslurried in ether and filtered.

Crude product is suspended in 100 ml. of water providing a solution of pH 4.2 and stirred for 10 minutes to hydrolyze O-formyl groups. The pH of the mixture is then adjusted to pH 5.5 and the solution freeze-dried to get crude product which is chromatographed on a cellulose column to obtain purified product as the main fraction.

EXAMPLE 13

*9-Acetylamino-11a-Fluorotetracycline-6,12-Hemi-Ketal*

To a solution of 4.2 g. of the product of Example 11 in 200 ml. of dry methanol is added 20 ml. of acetic anhydride and the mixture is stirred for 45 minutes at room temperature. The mixture is then stripped of most of the solvent and dropped into dry ether, filtered and the solid cake reslurried in ether, filtered and dried to obtain crude product.

The crude product is chromatographed as in Example 12 to obtain purified product as the main fraction.

Following the procedures of Examples 12 and 13, the following products are prepared:

9-butrylamino-11a-fluorotetracycline-6,12-hemi-ketal
9-propionylamino-11a-fluorotetracycline-6,12-hemi-ketal
9-valerylamino-11a-fluorotetracycline-6,12-hemi-ketal

EXAMPLE 14

*7-Chloro-9-Nitro-11a-Fluorotetracycline-6,12-Hemi-Ketal*

To 5 g. of 9-nitro-11a-fluorotetracycline-6,12-hemi-ketal in 15 ml. of liquid hydrogenfluoride (HF), cooled at ice bath temperature, is added 1.5 g. of N-chlorosuccinimide. The solution is stirred at ice bath temperature for 1.5 hours. The crude product is precipitated by the addition of 500 ml. of ether and recovered by filtration.

The crude product contains an appreciable proportion of 6-methylene impurity due to concomitant dehydration during the halogenation in liquid HF. The impurity is separated by partition chromatography utilizing a butanol: 0.01 N hydrochloric acid system and a cellulose powder column. Where the aforementioned halogenation procedure is applied to the 6-demethyl hemi-ketals such dehydration does not occur.

The above procedure is repeated substituting equivalent amounts of the products of Examples 11 and 12 to obtain respectively, 7-chloro-9-amino-11a-fluorotetracycline-6,12-hemi-ketal and 7-chloro-9-formylamino-11a-fluorotetracycline-6,12-hemi-ketal. Other 7-chloro-9-lower alkanoylamino - 11a - fluoro-tetracycline-6,12-hemi-ketals are also formed in accordance with the procedure of Example 13.

EXAMPLE 15

*7-Bromo-9-Nitro-11a-Fluorotetracycline-6,12-Hemi-Ketal*

This product is prepared in accordance with the procedure of Example 14 by using an equivalent amount of N-bromosuccinimide in place of N-chlorosuccinimide.

The procedure of Example 14 is also followed to produce the following compounds:

7-bromo-9-amino-11a-fluorotetracycline-6,12-hemi-ketal
7-bromo-9-formylamino-11a-fluorotetracycline-6,12-hemi-ketal
7-bromo-9-acetylamino-11a-fluorotetracycline-6,12-hemi-ketal
7-bromo-9-butrylamino-11a-fluorotetracycline-6,12-hemi-ketal
7-bromo-9-valerylamino-11a-fluorotetracycline-6,12-hemi-ketal

EXAMPLE 16

*7-Iodo-9-Nitro-11a-Fluorotetracycline-6,12-Hemi-Ketal*

The procedure of Example 15 is repeated but substituting an equivalent amount of N-iodosuccinimide for N-bromosuccinimide to obtain the corresponding products.

EXAMPLE 17

*6-Demethyl-9-Nitro-11a-Chlorotetracycline-6,12-Hemi-Ketal*

This compound is prepared from the product of Example 7 following the procedure of Example 10.

EXAMPLE 18

*6-Demethyl-9-Amino-11a-Chlorotetracycline-6,12-Hemi-Ketal*

The product of the preceding example is reduced to 6-demethyl-9-aminotetracycline following the procedure of Example 11.

To a solution of 1.0 g. of 9-amino-6-demethyltetracycline in 12 ml. of monoglyme (dimethyl ether of ethylene glycol) is added 400 mg. of N-chlorosuccinamide with stirring to dissolve the reagent. The mixture is allowed to stand for 8 minutes and then diluted with 12 ml. of water. The desired product crystallizes out of solution. Alternatively, the product is precipitated from the reaction mixture by addition of ether and hexane, as in Example 4.

EXAMPLE 19

*6-Demethyl-9-Formylamino-11a-Chlorotetracycline-6,12-Hemi-Ketal*

The procedure of Example 12 is repeated employing an equivalent amount of 6-demethyl-9-aminotetracycline as starting material to produce 6-demethyl-9-formylaminotetracycline. This product is, in turn, converted to the desired hemi-ketal product by treatment in accordance with the procedure set forth in the second paragraph of Example 18.

EXAMPLE 20

*6-Demethyl-9-Acetylamino-11a-Chlorotetracycline-6,12-Hemi-Ketal*

The procedure of Example 13 is repeated employing an equivalent amount of 6-demethyl-9-aminotetracycline as starting material to obtain 6-demethyl-9-acetylaminotetracycline. This product is, in turn, converted by the procedure described in the second paragraph of Example 18 to the desired hemi-ketal product.

Following the procedures of Examples 19 and 20, the following products are prepared:

6-demethyl-9-butrylamino-11a-chlorotetracycline-6,12-hemi-ketal
6-demethyl-9-propionylamino-11a-chlorotetracycline-6,12-hemi-ketal
6-demethyl-9-valerylamino-11a-chlorotetracycline-6,12-hemi-ketal

EXAMPLE 21

*6-Demethyl-7-Chloro-9-Nitro-11a-Chlorotetracycline-6,12-Hemi-Ketal*

The procedure set forth in the first paragraph of Example 14 is repeated employing an equivalent amount of 6-demethyl-9-nitro-11a-chlorotetracycline-6,12-hemi-ketal as starting material to obtain the desired product. The same product is obtained by nitration of the 6-demethyl-7,11a-dichlorotetracycline-6,12-hemi-ketal of Example 8 following the procedure of Example 10.

The procedure of Example 14 is repeated substituting equivalent amounts of 6-demethyl-9-amino-11a-chlorotetracycline-6,12-hemi-ketal and 6-demethyl-9-formylamino-11a-chlorotetracycline-6,12-hemi-ketal to produce the corresponding 7-chloro compounds. Other 6-demethyl-7-chloro-9-lower alkanoylamino-11a-fluorotetracycline-6,12-hemi-ketals are also formed in accordance with the procedure of Example 14 employing selected 7-deschloro starting compounds.

EXAMPLE 22

*6-Demethyl-7-Bromo-9-Nitro-11a-Chlorotetracycline-6,12-Hemi-Ketal*

This product is prepared in accordance with the procedure of the first paragraph of Example 14 employing equivalent amounts of 6-demethyl-9-nitro-11a-chlorotetracycline-6,12-hemi-ketal and N-bromo-succinimide.

The procedure of Example 14 is also followed but employing equivalent amounts of selected 6-demethyl-9-substituted-11a-chlorotetracycline-6,12-hemi-ketals and N-bromosuccinimide to produce the following compounds:

6-demethyl-7-bromo-9-amino-11a-chlorotetracycline-6,12-hemi-ketal
6-demethyl-7-bromo-9-formylamino-11a-chlorotetracycline-6,12-hemi-ketal
6-demethyl-7-bromo-9-acetylamino-11a-chlorotetraecycline-6,12-hemi-ketal
6-demethyl-7-bromo-9-butrylamino-11a-chlorotetracycline-6,12-hemi-ketal
6-demethyl-7-bromo-9-valerylamino-11a-chlorotetracycline-6,12-hemi-ketal

EXAMPLE 23

*6-Demethyl-7-Iodo-9-Nitro-11a-Chlorotetracycline-6,12-Hemi-Ketal*

The procedure of Example 22 is repeated but substituting an equivalent amount of N-iodosuccinimide for N-bromosuccinimide to obtain the desired product. 6-demethyl-7-iodo-9-substituted-11a-chlorotetracycline-6,12-hemi-ketals corresponding to the additional 7-bromo compounds of Example 22 are produced in the same fashion.

EXAMPLE 24

*6-Demethyl-7-Halo-11a-Chlorotetracycline-6,12-Hemi-Ketal*

The products wherein halo is chloro, bromo or iodo are prepared by direct halogenation of 6-demethyl-11a-chlorotetracycline-6,12-hemi-ketal in accordance with the procedures as described above.

EXAMPLE 25

In view of the fact that 6-demethyl-11a-fluorotetracycline-6,12-hemi-ketal is an extremely acid stable compound which requires fairly drastic reduction conditions in order to rupture the hemi-ketal bond and remove the 11a-fluoro substituent, D-ring substituted 6-demethyl-11a-fluorotetracycline-6,12-hemi-ketals may be formed in accordance with the procedures set forth in Examples 10–16, i.e., nitration, reduction of nitro to amino and conversion of amino to lower alkanoylamino while employing 6-demethyl-11a-fluorotetracycline-6,12-hemi-ketal as the initial starting material. Such procedures may then be followed by halogenation of the desired 6-demethyl-9-substituted-11a-fluorotetracycline-6,12-hemi-ketal. Furthermore, 6-demethyl-11a-fluorotetracycline-6,12-hemi-ketal is directly halogenated to produce the desired 6-demethyl-7-halo-11a-fluorotetracycline-6,12-hemi-ketal. Among the many compounds which may be produced by this method are:

6-demethyl-9-nitro-11a-fluorotetracycline-6,12-hemi-ketal
6-demethyl-9-amino-11a-fluorotetracycline-6,12-hemi-ketal
6-demethyl-9-formylamino-11a-fluorotetracycline-6,12-hemi-ketal
6-demethyl-9-acetylamino-11a-fluorotetracycline-6,12-hemi-ketal
6-demethyl-9-butrylamino-11a-fluorotetracycline-6,12-hemi-ketal
6-demethyl-9-valerylamino-11a-fluorotetracycline-6,12-hemi-ketal
6-demethyl-7-chloro-9-nitro-11a-fluorotetracycline-6,12-hemi-ketal
6-demethyl-7-chloro-9-amino-11a-fluorotetracycline-6,12-hemi-ketal
6-demethyl-7-chloro-9-formylamino-11a-fluorotetracycline-6,12-hemi-ketal
6-demethyl-7-chloro-9-acetylamino-11a-fluorotetracycline-6,12-hemi-ketal
6-demethyl-7-chloro-9-butrylamino-11a-fluorotetracycline-6,12-hemi-ketal
6-demethyl-7-chloro-9-valerylamino-11a-fluorotetracycline-6,12-hemi-ketal
6-demethyl-7-bromo-9-nitro-11a-fluorotetracycline-6,12-hemi-ketal
6-demethyl-7-bromo-9-amino-11a-fluorotetracycline-6,12-hemi-ketal
6-demethyl-7-bromo-9-formylamino-11a-fluorotetracycline-6,12-hemi-ketal
6-demethyl-7-bromo-9-acetylamino-11a-fluorotetracycline-6,12-hemi-ketal
6-demethyl-7-bromo-9-butrylamino-11a-fluorotetracycline-6,12-hemi-ketal
6-demethyl-7-bromo-9-valerylamino-11a-fluorotetracycline-6,12-hemi-ketal
6-demethyl-7-iodo-9-nitro-11a-fluorotetracycline-6,12-hemi-ketal
6-demethyl-7-iodo-9-amino-11a-fluorotetracycline-6,12-hemi-ketal
6-demethyl-7-iodo-9-formylamino-11a-fluorotetracycline-6,12-hemi-ketal
6-demethyl-7-iodo-9-acetylamino-11a-fluorotetracycline-6,12-hemi-ketal
6-demethyl-7-iodo-9-butrylamino-11a-fluorotetracycline-6,12-hemi-ketal
6-demethyl-7-iodo-9-valerylamino-11a-fluorotetracycline-6,12-hemi-ketal 6-demethyl-7-chloro-11a-fluorotetracycline-6,12-hemi-ketal
6-demethyl-7-chloro-11a-fluorotetracycline-6,12-hemi-ketal
6-demethyl-7-chloro-11a-fluorotetracycline-6,12-hemi-ketal

EXAMPLE 26

*5-Hydroxy-7-Halo-11a-Fluorotetracycline-6,12-Hemi-Ketal*

5-hydroxy-11a-fluorotetracycline-6,12-hemi-ketal as prepared in accordance with the procedure of Example 2 is an extremely acid stable compound which requires relatively drastic reduction conditions to rupture the hemi-ketal bond and remove the 11a-fluoro substituent. Thus, the various 5-hydroxy-9-substituted-11a-fluorotetracycline-6,12-hemi-ketals within the scope of the present invention may be prepared by direct nitration, reduction of the nitro group to amino and conversion of amino to lower alkanoylamino. Any one of these resulting 9-substituted compounds may, in turn, be halogenated. Thus, the procedures of Examples 10–16 above are repeated but employing 5-hydroxy-11a-fluorotetracycline-6,12-hemi-ketal as the initial starting material to obtain products exemplified by the following:

5-hydroxy-9-nitro-11a-fluorotetracycline-6,12-hemi-ketal
5-hydroxy-9-amino-11a-fluorotetracycline-6,12-hemi-ketal
5-hydroxy-9-formylamino-11a-fluorotetracycline-6,12-hemi-ketal
5-hydroxy-9-acetylamino-11a-fluorotetracycline-6,12-hemi-ketal
5-hydroxy-9-butrylamino-11a-fluorotetracycline-6,12-hemi-ketal
5-hydroxy-9-valerylamino-11a-fluorotetracycline-6,12-hemi-ketal
5-hydroxy-7-chloro-9-nitro-11a-fluorotetracycline-6,12-hemi-ketal
5-hydroxy-chloro-9-amino-11a-fluorotetracycline-6,12-hemi-ketal
5-hydroxy-7-chloro-9-formylamine-11a-fluorotetracycline, 6,12-hemi-ketal
5-hydroxy-7-chloro-9-acetylamino-11a-fluorotetracycline-6,12-hemi-ketal
5-hydroxy-7-chloro-9-butrylamino-11a-fluorotetracycline-6,12-hemi-ketal
5-hydroxy-7-chloro-9-valerylamino-11a-fluorotetracycline-6,12-hemi-ketal
5-hydroxy-7-bromo-nitro-11a-fluorotetracycline-6,12-hemi-ketal
5-hydroxy-7-bromo-9-amino-11a-fluorotetracycline-6,12-hemi-ketal
5-hydroxy-7-bromo-9-formylamino-11a-fluorotetracycline-6,12-hemi-ketal
5-hydroxy-7-bromo-9-acetylamino-11a-fluorotetracycline-6,12-hemi-ketal
5-hydroxy-7-bromo-9-butrylamino-11a-fluorotetracycline-6,12-hemi-ketal
5-hydroxy-7-bromo-9-valerylamino-11a-fluorotetracycline-6,12-hemi-ketal
5-hydroxy-7-iodo-9-nitro-11a-fluorotetracycline-6,12-hemi-ketal
5-hydroxy-7-iodo-9-amino-11a-fluorotetracycline-6,12-hemi-ketal
5-hydroxy-7-iodo-9-formylamino-11a-fluorotetracycline-6,12-hemi-ketal
5-hydroxy-7-iodo-9-acetylamino-11a-fluorotetracycline-6,12-hemi-ketal
5-hydroxy-7-iodo-9-butrylamino-11a-fluorotetracycline-6,12-hemi-ketal
5-hydroxy-7-iodo-9-valerylamino-11a-fluorotetracycline-6,12-hemi-ketal
5-hydroxy-7-chloro-11a-fluorotetracycline-6,12-hemi-ketal
5-hydroxy-7-bromo-11a-fluorotetracycline-6,12-hemi-ketal
5-hydroxy-7-iodo-11a-fluorotetracycline-6,12-hemi-ketal

EXAMPLE 27

*5-Hydroxy-9-Nitro-11a-Chlorotetracycline-6,12-Hemi-Ketal*

To a solution of 1 g. of 5-hydroxy-11a-chlorotetracycline-6,12-hemi-ketal in 8 ml. of anhydrous liquid hydrogen fluoride (HF) at 0° C. is added 220 mg. of KNO₃. The mixture is stirred for 20 minutes at 0° C. and the HF evaporated off under nitrogen. Crude product is obtained by slurrying in dry ether, filtering and drying. The desired product is then separated from other reaction products including, inter alia, 9-nitro-11a-chloro-6-deoxy-6-demethyl-6-methylene-5-oxytetracycline, by partition chromatography on a column of cellulose powder.

EXAMPLE 28

*5-Hydroxy-9-Amino-11a-Chlorotetracycline-6,12-Hemi-Ketal*

A mixture of 1 g. of 5-hydroxy-9-nitro-11a-chlorotetracycline-6,12-hemi-ketal in 70 ml. of water containing 1 g. of sodium hydrosulfite is stirred for 30 minutes at room temperature. The mixture is then extracted with butanol and the butanol extract is evaporated to dryness to obtain 5-hydroxy-9-aminotetracycline.

To a solution of 2.8 g. of 5-hydroxy-9-aminotetracycline in 25 ml. of monoglyme (dimethyl ether of ethylene glycol) is added 800 mg. of N-chlorosuccinimide with stirring to dissolve the reagent. The mixture is allowed to stand for 8 minutes and then diluted with 25 ml. of water to obtain the desired product as a crystalline solid.

EXAMPLE 29

*5-Hydroxy-9-Loweralkanoylamino-11a-Chlorotetracycline-6,12-Hemi-Ketal*

The procedures of Examples 12 and 13 are followed employing an equivalent amount of 5-hydroxy-9-amino-11a-chlorotetracycline-6,12-hemi-ketal as starting material to obtain:

5-hydroxy-9-formylamino-11a-chlorotetracycline-6,12-hemi-ketal
5-hydroxy-9-acetylamino-11a-chlorotetracycline-6,12-hemi-ketal
5-hydroxy-9-butrylamino-11a-chlorotetracycline-6,12-hemi-ketal
5-hydroxy-9-propionylamino-11a-chlorotetracycline-6,12-hemi-ketal
5-hydroxy-9-valerylamino-11a-chlorotetracycline-6,12-hemi-ketal

EXAMPLE 30

*5-Hydroxy-7-Halo-9-Substituted-11a-Chlorotetracycline-6,12-Hemi-Ketal*

The procedures of Examples 14–16 herein are duplicated employing appropriate 7-deshalo-9-substituted-11a-chlorotetracycline-6,12-hemi-ketals to obtain the following products;

5-hydroxy-7-chloro-9-nitro-11a-chlorotetracycline-6,12-hemi-ketal
5-hydroxy-7-chloro-9-amino-11a-chlorotetracycline-6,12-hemi-ketal
5-hydroxy-7-chloro-9-formylamino-11a-chlorotetracycline-6,12-hemi-ketal
5-hydroxy-7-chloro-9-acetylamino-11a-chlorotetracycline-6,12-hemi-ketal
5-hydroxy-7-chloro-9-butrylamino-11a-chlorotetracycline-6,12-hemi-ketal
5-hydroxy-7-chloro-9-valerylamino-11a-chlorotetracycline-6,12-hemi-ketal
5-hydroxy-7-bromo-9-nitro-11a-chlorotetracycline-6,12-hemi-ketal
5-hydroxy-7-bromo-9-amino-11a-chlorotetracycline-6,12-hemi-ketal 5-hydroxy-7-bromo-9-formylamino-11a-chlorotetra-
cycline-6,12-hemi-ketal
5-hydroxy-7-bromo-9-acetylamino-11a-chlorotetracycline-
6,12-hemi-ketal
5-hydroxy-7-bromo-9-butrylamino-11a-chlorotetracycline-
6,12-hemi-ketal
5-hydroxy-7-bromo-9-valerylamino-11a-chlorotetra-
cycline-6,12-hemi-ketal
5-hydroxy-7-iodo-9-nitro-11a1chlorotetracycline-6,12-
hemi-ketal
5-hydroxy-7-iodo-9-amino-11a-chlorotetracycline-6,12-
hemi-ketal
5-hydroxy-7-iodo-9-formylamino-11a-chlorotetracycline-
6,12-hemi-ketal
5-hydroxy-7-iodo-9-acetylamino-11a-chlorotetracycline-
6,12-hemi-ketal
5-hydroxy-7-iodo-9-butrylamino-11a-chlorotetracycline-
6,12-hemi-ketal
5-hydroxy-7-iodo-9-valerylamino-11a-chlorotetracycline-
6,12-hemi-ketal Similarly, 5-hydroxy-11a-chlortetracycline-6,12-hemi-ketal is halogenated in accordance with the procedures of Examples 14–16 to obtain the following products, partition chromatography on a column of cellulose powder being employed to obtain relatively pure product:

5-hydroxy-7-chloro-11a-chlorotetracycline-6,12-hemi-
ketal
5-hydroxy-7-bromo-11a-chlorotetracycline-6,12-hemi-
ketal
5-hydroxy-7-iodo-11a-chlorotetracycline-6,12-hemi-ketal The corresponding 5-hydroxy-7-halo-11a-fluorotetracycline-6,12-hemi-ketals are similarly prepared employing 5-hydroxy-11a-fluorotetracycline-6,12-hemi-ketal as starting material.

EXAMPLE 31

*Acid Salts of 11a-Halotetracycline-6,12-Hemi-Ketals*

The hydrochloride salts of the above described 11a-halo compounds are prepared by dissolving the free base in methanol or water containing an equimolar amount of hydrogen chloride and evaporating the resulting solution.

In similar fashion, salts are formed with sulfuric, hydrobromic and phosphoric acids.

EXAMPLE 32

*Dehydration of 11a-Chlorotetracycline-6,12-Hemi-Ketal*

The starting compound is dissolved in liquid hydrogen fluoride (in a ratio of 2 g./15 ml.) at 0° C. The mixture is maintained at this temperature for 10–15 minutes, after which the hydrogen fluoride is evaporated off. The residue is triturated in ether to obtain the solid product, 11a-chloro-6-deoxy-6-demethyl-6-methylenetetracycline, as the hydrofluoride salt which is recrystallized from methanol.

Alternatively, the crude hydrofluoride product (10 g.) is dissolved in 350 ml. of $H_2O$ by warming and stirring. An equal volume of conc. HCl is added to the clear solution and the product crystallizes as the hydrochloride salt. Infrared analysis of the product in a KBr pellet at 1% concentration shows carbonyl absorption at $5.70\mu$. Bioassay of the product (*K. pneumoniae*) shows an oxytetracycline activity of 50–100 mcg./mg. Ultraviolet analysis of the sample in 0.01 N methanol-HCl shows maxima at 376, 278 and 242 m$\mu$. The product shows an $R_f$ value of 0.2 in the following system:

Mobile phase: 20:2 toluene-pyridine saturated with pH 4.2 buffer
Immobile phase: pH 4.2 buffer (aqueous)

On analysis of the papergram with ultraviolet light, the product spot does not fluoresce strongly. However, on spraying with aqueous sodium hydrosulfite, it shows strong fluorescence.

When the product is boiled in methanolic-conc. HCl mixture the unchanged product is recovered. Under the same conditions, the starting compound is converted to a compound presumed to be 11a-chloroisotetracycline which on treatment with aqueous sodium hydrosulfite yields isotetracycline.

EXAMPLE 33

*Dehydration of 11a-Fluorotetracycline-6,12-Hemi-Ketal*

The starting compound, 250 mg., is stirred in 2 ml. of 63% aqueous perchloric acid. The solid dissolves on warming to 60°–65° C. for 15 minutes after which the mixture is cooled and water is added to obtain 11a-fluoro-6-deoxy-6-demethyl-6-methylenetetracycline as the perchlorate salt. The product shows ultraviolet and infrared absorption similar to that of Example 32.

EXAMPLE 34

Using the procedures of Examples 32 and 33 the 6-methyl-11a-halotetracyclines of the foregoing examples are dehydrated to products corresponding to those of Example 32, e.g.:

7,11a-dichloro-6-deoxy-6-demethyl-6-methylenetretracy-
cline
5-hydroxy-11a-chloro-6-deoxy-6-demethyl-6-methylene-
tetracycline
5-hydroxy-11a-fluoro-6-deoxy-6-demethyl-6-methylene-
tetracycline
5-hydroxy-9-amino-11a-fluoro-6-deoxy-6-demethyl-6-
methylenetetracycline
5-hydroxy-7-chloro-9-amino-11a-fluoro-6-deoxy-6-de-
methyl-6-methylenetetracycline
5-hydroxy-11a-chloro-6-deoxy-6-demethyl-6-methylene-
tetracycline
5-hydroxy-11a-fluoro-6-deoxy-6-demethyl-6-methylene-
tetracycline

EXAMPLE 35

11a-chloro-6-deoxy-6-demethyl - 6 - methylenetetracycline, 5 mg., is dissolved in 3 ml. of methanol and a freshly prepared solution of sodium hydrosulfite (20 mg. in 2 ml. of water) is added. The mixture is allowed to stand for 15 minutes at room temperature, after which it is stripped of methanol and extracted with butanol. The butanol extract is concentrated to obtain the product, 6-deoxy-6-demethyl-6-methylenetetracycline. The product is crystallized from acetonitrile. Alternatively, it is crystallized as the hydrochloride salt from water by addition of concentrated HCl.

On testing against *K. pneumoniae*, the product has an oxytetracycline activity of at least 1100 mcg./mg. The product shows an $R_f$ value of 0.6 in the same system as described in Example 32 and follows the solvent front in the following system:

Mobile phase: 20:10:3 nitromethane; chloroform, pyridine
Immobile phase: pH 3.5 buffer (aqueous)

EXAMPLE 36

*6-Demethyl-7-Chloro-9-Aminotetracycline*

6-demethyl-7-chloro - 9 - nitro-11a-chlorotetracycline-6,12-hemi-ketal, 50 mg., is combined with 1 ml. 1:1 by volume methanol:water and treated with 200 mg. sodium hydrosulfite. The mixture is allowed to stand for 15 minutes at room temperature, after which it is stripped of methanol, extracted with butanol, and the butanol extract evaporated to obtain the product as residue. Further purification may be achieved by chromatography and other standard procedures. The product exhibits activity in vitro vs. *K. pneumoniae* and other microorganisms, including a broad range of Gram negative organisms.

By room-temperature treatment with acetoformic anhydride, this product is converted to the corresponding 9-formamido derivative, which exhibits further, enhanced antimicrobial activity.

EXAMPLE 37

*6-Demethyl-9-Aminotetracycline*

6-demethyl - 9 - nitro-11a-chlorotetracycline-6,12-hemiketal, 50 mg., is dissolved in 1.25 ml. 1:56 by volume conc. HCl:water plus 1 ml. acetone. 30 mg. zinc dust is added and the mixture is stirred for 15 minutes at 20° C. The reaction mixture is then filtered, the filtrate extracted with butanol, and the butanol extract evaporated to obtain the desired antibiotic as residue.

EXAMPLE 38

*6-Demethyl-7-Chlortetracycline*

This antibiotic is prepared by the procedure of Example 37, substituting 6-demethyl-7-chloro-11a-fluorotetracycline-6,12-hemi-ketal for the starting compound of the earlier example.

EXAMPLE 39

The 11a-halotetracycline-6,12-hemi-ketals of the preceding examples are converted to the corresponding tetracycline antibiotics by 11a-dehalogenation as described in Examples 36–38. Aromatic nitro groups, where present, are currently reduced to amino.

What is claimed is:
1. A compound selected from the group consisting of

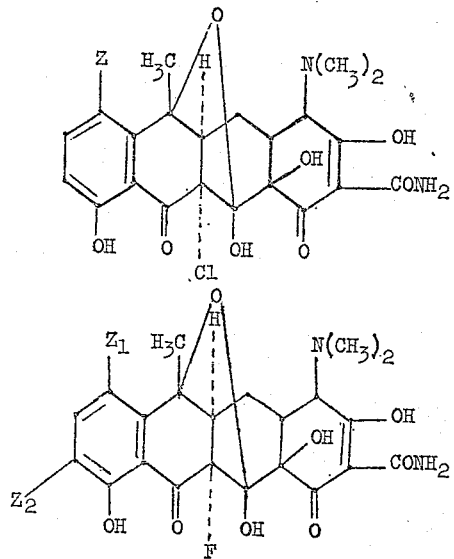

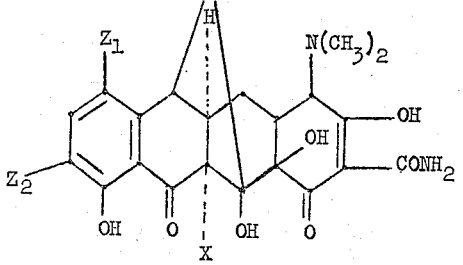

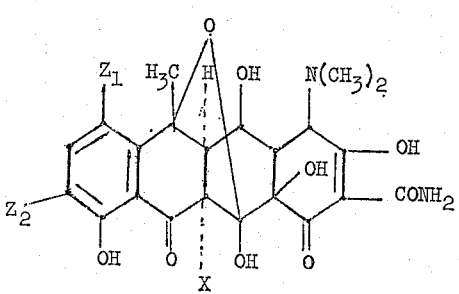

wherein:
Z is selected from the group consisting of hydrogen and chloro;
$Z_1$ is selected from the group consisting of hydrogen, chloro, bromo and iodo;
$Z_2$ is selected from the group consisting of hydrogen, nitro, amino and lower alkanoylamino; and
X is selected from the group consisting of chloro and fluoro;
and the mineral acid addition salts thereof.
2. 11a-fluoro-5-hydroxytetracycline-6,12-hemi-ketal.
3. 11a-chloro-5-hydroxytetracycline-6,12-hemi-ketal.
4. 11a-fluorotetracycline-6,12-hemi-ketal.
5. 11a-chlorotetracycline-6,12-hemi-ketal.
6. 7,11a-dichlorotetracycline-6,12-hemi-ketal.
7. 9-amino-11a-fluorotetracycline-6,12-hemi-ketal.
8. 6-demethyl-7-chloro-9-nitro-11a-chlorotetracycline-6,12-hemi-ketal.

References Cited in the file of this patent
UNITED STATES PATENTS
2,984,686    Blackwood _____ May 16, 1961